United States Patent [19]

Yamano

[11] Patent Number: 4,652,991
[45] Date of Patent: Mar. 24, 1987

[54] DATA TRANSFER APPARATUS

[75] Inventor: Kozo Yamano, Tokyo, Japan

[73] Assignee: Nippon Electric Co., Ltd., Tokyo, Japan

[21] Appl. No.: 790,333

[22] Filed: Oct. 23, 1985

Related U.S. Application Data

[63] Continuation-in-part of Ser. No. 739,659, May 15, 1985, abandoned, which is a continuation of Ser. No. 358,650, Mar. 16, 1982, abandoned, which is a continuation of Ser. No. 67,117, Aug. 16, 1979, abandoned.

[30] Foreign Application Priority Data

Aug. 22, 1978 [JP] Japan ................................ 53-102625

[51] Int. Cl.$^4$ ............................................. G06F 13/38
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,029,412 | 4/1962 | Southard | 364/900 |
| 4,047,244 | 9/1977 | Finkemeyer et al. | 364/200 |
| 4,138,732 | 2/1979 | Suzuki et al. | 364/900 |

Primary Examiner—Thomas M. Heckler
Attorney, Agent, or Firm—Blakely, Sokoloff, Taylor & Zafman

[57] ABSTRACT

In an information processing apparatus of the type comprising a CPU, a memory device and input and output device, where a portion of the memory region storing a plurality of bytes as a unit of data to be stored overlaps a portion of the memory region to which the data are transferred, there are provided an address difference calculating circuit for calculating the difference of the addresses at the data transfer and data receiving sides, a comparator for comparing respective addresses, and a recurrent data pattern forming circuit for exchanging data between the memory region for storing the data and the memory region for receiving the data by a number corresponding to the difference of the addresses.

1 Claim, 22 Drawing Figures

F I G. 2E
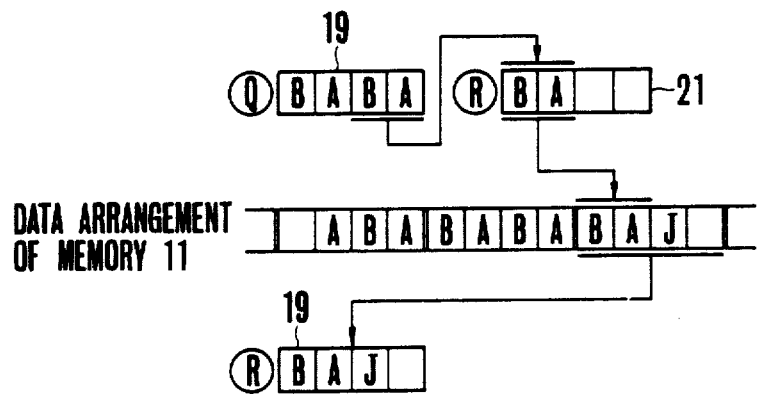
F I G. 2F
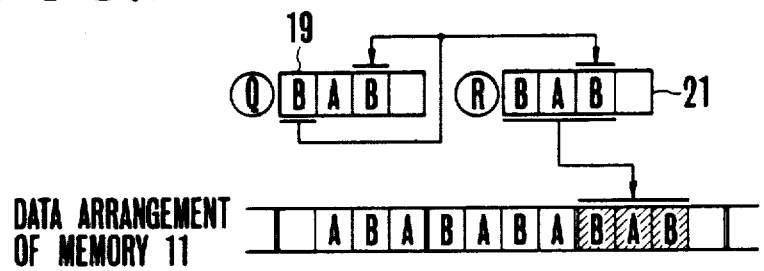
F I G. 3A
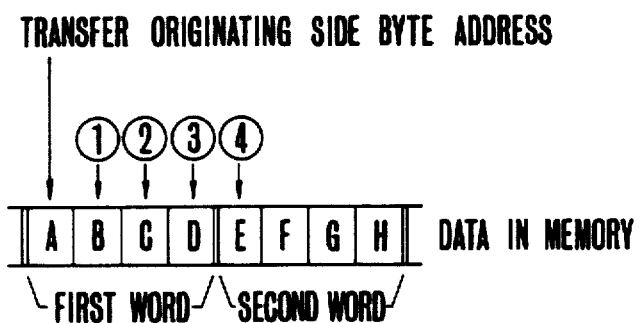

DATA TRANSFER APPARATUS

This is a continuation-in-part of application Ser. No. 739,659 filed May 15, 1985, abandoned, which is a continuation application of Ser. No. 358,650 filed 3/16/82, abandoned, which is continuation of parent application Ser. No. 067,117, filed on 8/16/79, abandoned.

BACKGROUND OF THE INVENTION

This invention relates to a data transfer apparatus, more particularly a data transfer apparatus in which, in a memory device utilizing a plurality of bytes as a unit of an input or output, a portion of the memory region in which a unit of data to be transferred is stored overlaps a portion of the memory region to which the unit of data is to be transferred.

Generally an information processing apparatus is constituted by such basic elements as a central processing unit (CPU), a memory device storing a program, data, etc., and input and output (I/0) devices. This CPU comprises an instruction processing unit which functions to process instructions, operands, and addresses and an arithmetic operation unit. The former makes an access to the memory device and the arithmetic operation unit causes the same to perform desired arithmetic operations in response to an instruction obtained from the memory device and then designates an address of the memory device, in accordance with the result of the arithmetic operation, to write the operated and processed data into the memory device.

FIG. 1 shows the essential portions of a central processing unit (CPU) operatively connected to a prior art data transfer apparatus comprising, as essential component elements, a memory device 11 and a CPU 12. The CPU performs instruction processing, operand processing and address processing. The CPU comprises an instruction processing unit 12A connected to receive instructions from the memory device 11, and an arithmetic operation processing unit 12B which performs necessary arithmetic operations based on the instructions from the instruction processing unit 12A. The instruction processig unit 12A shown in the drawing comprises a first memory address register which stores the address of a byte in memory device 11 which address is the beginning or origination address of a plurality of bytes to be transferred to the destination or receive byte address of a second plurality of bytes, which destination or receive byte address is stored in a second memory address register. The first memory address register will hereinafter be referred to as transfer origination side address register 13 and the second memory address register will hereinafter be referred to as transfer receiving side address register 14. The transfer origination side address register 13 and the transfer receiving side address register 14 are capable of incrementing by 1. The instruction processing unit 12a further comprises a word address coincidence detecting circuit 15 which compares the word addresses of both registers 13 and 14 so as to detect whether these addresses coincide with each other or not, a control circuit 16 for reading from memory device 11 in accordance with the two least significant bits of the transfer originating side address registor 13 and the output of the detecting circuit 15, and a control circuit 17 for writing to memory device 11 in accordance with the least significant two bits of the transfer receiving side address register 14.

The arithmetic operation processing unit 12B comprises a renewal control circuit 18 which renews first memory data register hereinafter referred to as transfer originating side data register 19 with the data in the transfer originating side address register 13 in response to the output of the word address coincidence detecting circuit 15. The transfer originating side data register 19 holds the data words to be transferred to the memory device 11 (although in the following description one word comprises four bytes the number of bytes may be variable). A selection circuit 20 selects one byte of the data register 19 represented by the least significant two bits (a byte address in a word) of the transfer originating side address register 13 and a second memory data register hereinafter referred to as transfer receiving side data register 21 which holds one byte from the selecting circuit 20 in a byte position represented by the least significant two bits transfer receiving side address register 14.

The operation of the apparatus shown in FIG. 1 will now be described with reference to FIGS. 2A through 2F. FIG. 2A shows an arrangement of the data in the memory device 11 before transfer, that is the transfer originating side data arrangement, and 8 byte data A–H is transferred from an address $a_1$ to an address $a_2$. Dual lines between groups of 4 bytes represent paired bytes which are handled as a single unit or an information, and Ⓟ and Ⓡ represent words.

FIG. 2B shows the transfer operation in which the data word Ⓟ in the memory device 11 is transfer originating side data register 19. Then the data to be transferred is stored (in this example, the data A in the second address of transfer originating side data register 19) in a position previously designated by the transfer receiving side address register 14. The data stored in the transfer receiving side data register 21 is transferred to a predetermined byte (the fourth address) of the transfer receiving side data word Ⓟ of the memory device 11.

FIG. 2C shows the operation in which after the remaining two bytes (the third and fourth addresses) of the transfer originating side data word Ⓟ has been transferred to the receiving side data register 21, and in view of the fact that the transferred data word Ⓠ is coincident with the received data word, a portion of the data in the receiving side data register 21 including the transferred byte is stored in the transfer originating side data word Ⓠ and then the transfer originating side data word Ⓠ is read and stored in the transfer originating side data register 19.

FIG. 2D is a diagram showing that, subsequent to the operation shown in FIG. 2C the operation as that shown in FIG. 2B is performed. FIG. 2E shows an operation similar to that shown in FIG. 2B, while FIG. 2F shows the content of the memory device 11 at a time when the transfer of 8 bytes has been completed.

As can be noted from the foregoing description regarding the operation of the prior art apparatus, in order to process one word it is necessary to access the memory device three times including a read out operation of the transfer originating data, a writing operation thereof, and a writing operation of the transferred data.

SUMMARY OF THE INVENTION

Accordingly, it is a principal object of this invention to provide a novel data transfer apparatus capable of improving the data transfer performance over the prior art apparatus.

According to this invention there is provided a data transfer apparatus wherein a plurality of bytes constitute one unit of an input or output of a memory device and wherein a portion of a memory region for storing data to be transferred overlaps a portion of a memory region for storing the transferred data. The data transfer apparatus comprises address storing means for storing byte addresses respectively assigned to a plurality of bytes to be transferred; (hereinafter transfer originating side address storing means); address storing means for storing byte addresses respectively assigned to a plurality of bytes to be transferred to (hereinafter transfer receiving side address storing means); address differences calculating means for calculating difference between addresses and stored in the transfer originating side address storing means and addresses stored in the transfer receiving side address storing means; comparing means for comparing addresses from both of the address storing means; read out means for reading out the data to be transferred from the memory device in terms of units each comprising the plurality of the bytes; storing means for storing the transfer originating side data read out by the read out means (hereinafter transfer originating side data storing means); means for forming data including means for storing transferred data, means for designating a specific byte address in the data stored in the transfer originating side data storing means by the least significant two bits of the transfer originating side address storing means; means for designating a byte of data other than the transferred data by another one of the plurality of byte addresses for transferring the last mentioned designated data to a corresponding address of the transfer originating side data storing means; and means for repeating operations mentioned above by a number of times equal to the difference between the addresses as calculated by the address difference calculating means; and transfer means for transfering the data formed by the data forming means to the memory means.

BRIEF DESCRIPTION OF THE DRAWINGS

In the accompanying drawings:

FIGS. 2A through 2F are diagrams showing the operation of data transfer of the apparatus shown in FIG. 1;

FIG. 3A is a diagram showing one example of a data arrangement of the memory device for explaining a recurrent data pattern with reference to Table 1;

DESCRIPTION OF THE PREFERRED EMBODIMENTS

Figure 1:
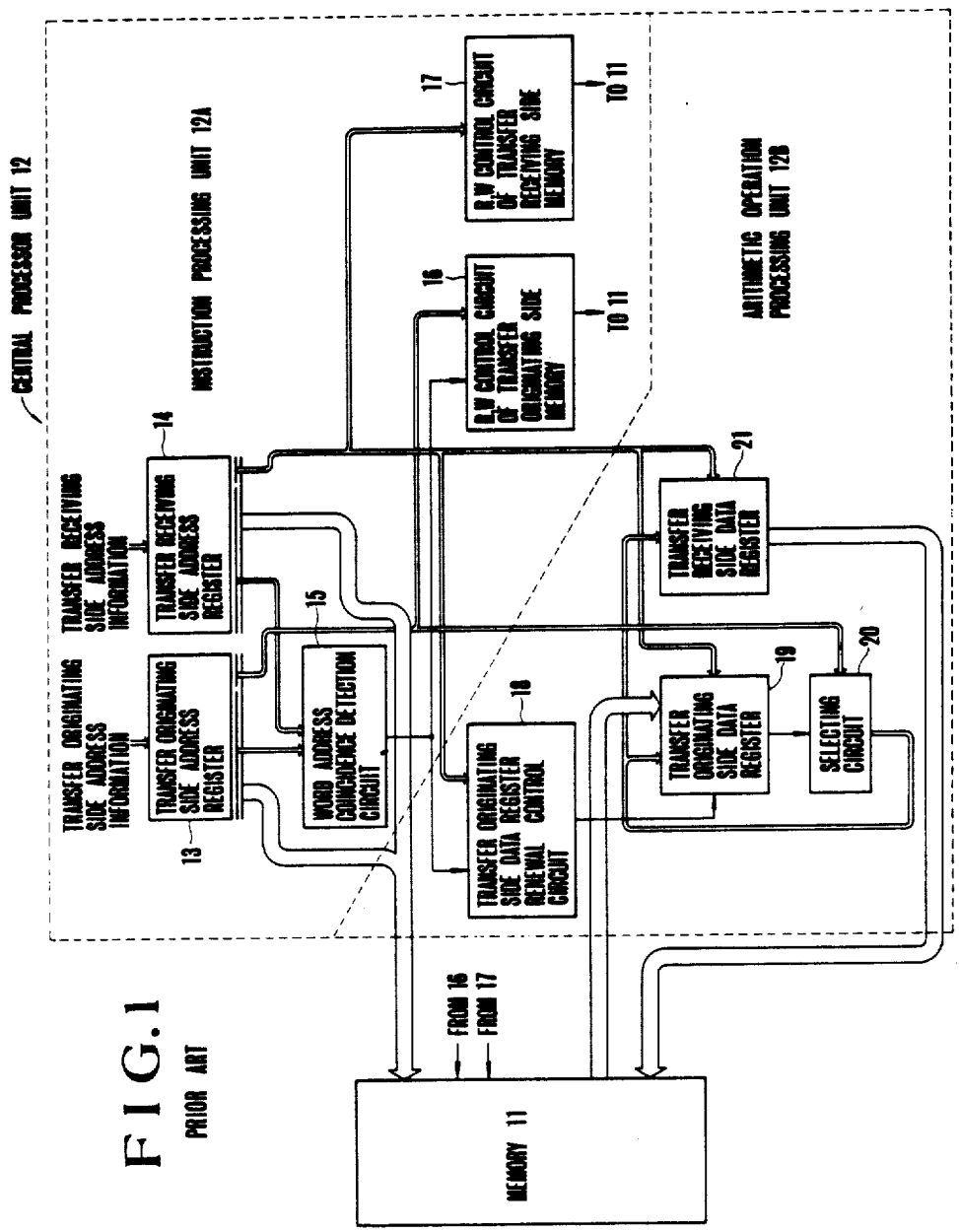
FIG. 1 is a block diagram showing essential component elements of a central processing unit (CPU) operatively associated with a memory device of a prior art information processing apparatus.
Figure 2A:
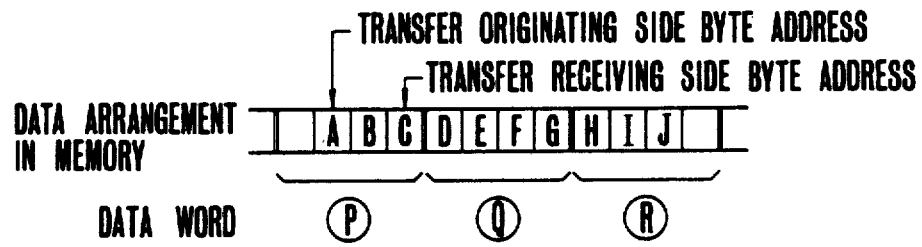
Figure 2B:
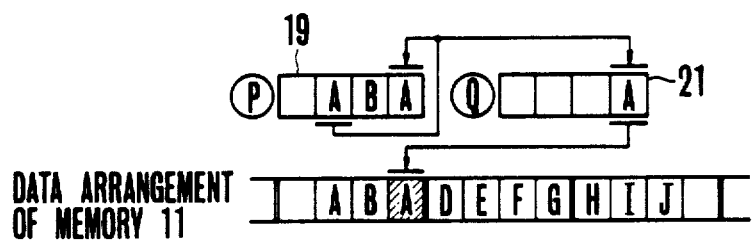
Figure 2C:
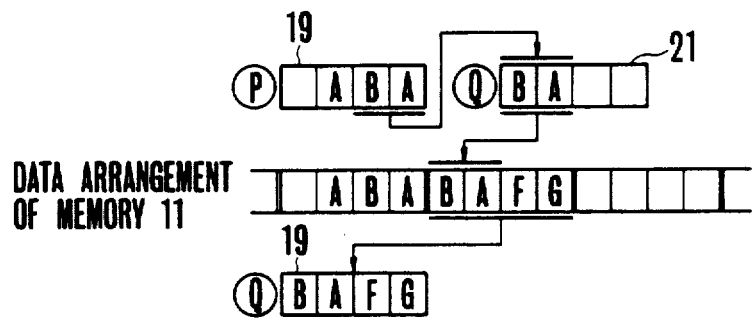
Figure 2D:
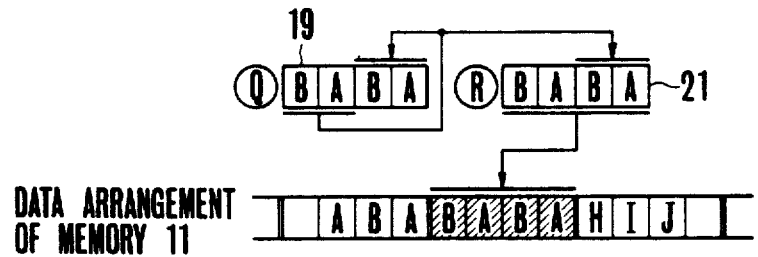
Figure 3:
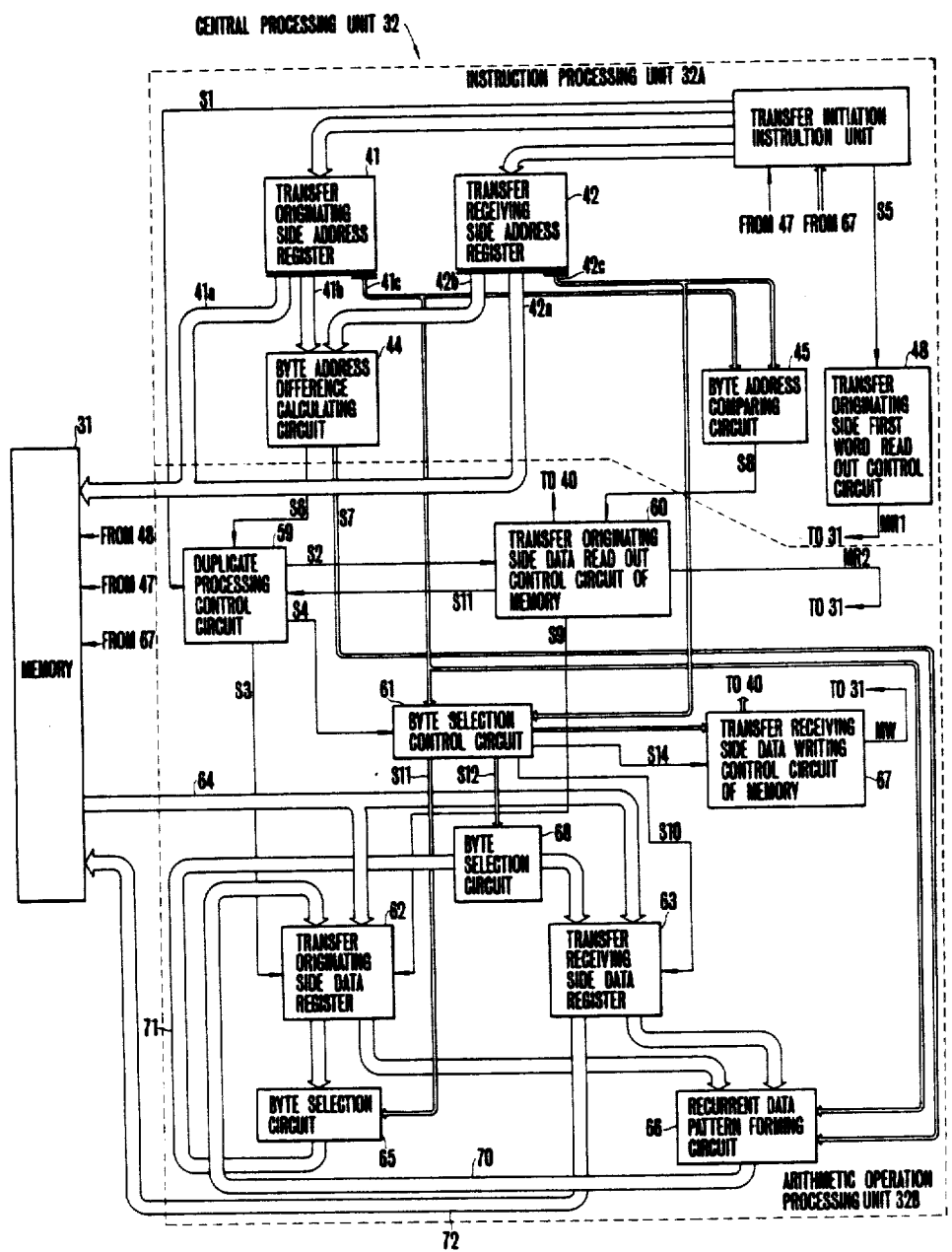
FIG. 3 is a block diagram showing component elements of one embodiment of the information processing apparatus according to this invention corresponding to those shown in FIG. 1.

FIG. 3 illustrates a preferred embodiment of the information processing apparatus of this invention, especially a memory device and the principal component parts of a central processing unit (CPU) 32 corresponding to those shown in FIG. 1. The central processing unit 32 comprises an instruction processing unit 32A and an arithmetic processing unit 32B. The instruction processing unit 32A of the CPU 32 comprises a transfer initiation unit 40 for executing a transfer initiation instruction; a transfer originating side (TOS) address register 41 capable of sending a transfer originating address to a memory device 31 over a line 41a in the same manner as in the prior art, and a transfer receiving side (TRS) address register 42 capable of sending a transfer receiving side address to the memory device 31 over a line 42a. The address registers 41 and 42 shown in FIG. 3 are different slightly from those shown in FIG. 1 in that they can not increment by one, and the TOS and TRS addresses are supplied each time when it is desired to access the memory device 31 from the transfer initiation instruction unit 40.

The instruction processing unit 32A comprises a byte address difference calculating circuit 44 which compares a TOS address stored in the register 41 with a TRS address stored in the register 42 to produce an output when the absolute value of the address difference is within one word (in this example 4 bytes) and when the TOS address is at a lower order than that of the TRS address, a byte address comparing circuit 45 which detects whether the transfer originating side byte position (a byte address in one word) is at a higher order or equal to the transfer receiving side byte position (in a word) in accordance with the least significant two bits of registers 41 and 42 derived from lines 41c and 42c, and a control circuit 48 responsive to a control signal S5 from the transfer initiation instruction unit 40 for reading a TOS first word data of the memory device 31.

The transfer initiation instruction unit 40 is constructed to send a control signal S1 for initiating transfer to a duplicate processing control circuit 59 to be described later, to send out a signal to the TOS address register 41 in accordance with the signal sent from a second word read out control circuit 60 (to be described later) of the memory device, and to send a signal to the TRS address register 42 to form a transfer receiving side address in accordance with an output of a transfer receiving side (TRS) data write control circuit 67 (to be described later) of the memory device 31.

Furthermore, the arithmetic operation processing unit 32B of the CPU 32 comprises a duplicate processing control circuit 59 which is set to the duplicate processing waiting or queneing state and to send out control signals S2, S3 and S4 for effecting the duplicate processing in response to a control signal S6 produced by the byte address difference calculating circuit 44 when the address difference of the registers 41 and 42 is within one word and when the TOS address is at a lower order than that of the transfer receiving address; thereby repeating the processing, i.e., storing of a data pattern, a number of times equal to the difference between the addresses calculated by the byte address difference calculating circuit.

The control signal S2 sent out from the control circuit 59 is sent to a control circuit 60 which controls reading of the TOS second word data of the memory device 31. When supplied with the control signal S2, the control circuit 60 supplies to the memory device 31 a read out signal MR2 that controls the read out control of the transfer originating side second word data of the memory device 31. At the same time, the control circuit 60 supplies a control signal to the transfer initiation instruction unit 40 for causing it to supply a transfer originating side address to the register 41 for reading the second word.

Further, the arithmetic operation processing unit 32B includes a byte selection control circuit 61 supplied with the control signal S4. The control circuit 61 commences its byte selection control operation when it receives the control signal S4 to supply control signals S11 and S12 to a byte selecting circuit 65 and 68 to be described later and supplies a control signal S14 to a control circuit 67 which controls the writing of the transfer receiving data to be transferred to the memory device 31. Also the control circuit 61 supplies to transfer receiving side register 63 a control signal S10 that controls the storing of the data into the TRS data register 63. The byte selection control circuit 61 is connected to receive the informations of the least significant two bits of the registers 41 and 42 respectively. The detail of the byte selection control circuit 61 will be described later with reference to FIG. 4.

The arithmetic operation processing unit 32B further comprises a transfer originating side (TOS) data register 62 supplied with one word (zero byte construction) data of an address in a memory device 31 designated by the TOS address register 41 through a line 64, and a transfer receiving side (TRS) data register 63 sequentially supplied with a second word data of an address in the memory device designated by the TRS address register 42 through a line 64 and the data of a byte selected transfer originating data register 62 to be described later. In response to a control signal S9 from the control circuit 60, the TOS data register 62 stores the data sent from the memory device 31 over line 64 and also stores a recurrent data pattern from a recurrent data pattern forming circuit 66 to be described later in response to a control signal sent from the duplicate processing control circuit 59. The TRS data register 63 writes byte data from the memory device 31 and the TOS data register 62 in accordance with a control signal sent from the byte selection control circuit 61. The control signal S3 sent from the control circuit 59 is formed from a control signal S11 sent to the control circuit 59 when the control circuit 60 produces a MR2 read out signal for reading out the transfer originating side second word data. The signal S11 is used to store the output of the pattern forming circuit 66 to a TRS data register 63 to be described hereinafter.

Further, the arithmetic operation processing unit 32B comprises a byte selection circuit 65 which sends to line 71 only a byte data selected by the control signal S11 supplied from the byte selection control circuit 61 among the data stored in the TOS register 62, and a byte selecting circuit 68 which determines the position of the TRS data register 63 for storing the byte data sent to the line 71 in accordance with a control signal S12 from the byte selection control circuit 61.

Moreover, the arithmetic operation processing unit 62 comprises a recurrent data pattern forming circuit 66 that characterizes the invention. This circuit 66 is connected to receive the data of registers 62 and 63 for forming a recurrent data pattern from these data in accordance with the least significant two bits informations of the byte address difference calculating circuit 44 and the TOS address register 41. The recurrent data pattern formed by the circuit 66 is sent to the TOS data register 62 via a line 70. Since the detail of the recurrent data pattern forming circuit 66 will be described later with reference to FIG. 5, its operation will be described briefly at this stage of the description. Where words of the four bytes construction as shown in FIG. 3A are stored in the memory device 31, the transfer originating initiation byte address is at the first byte position of the first word and where the transfer receiving initiation byte addresses are 1 through 4 the recurrent data pattern derived out from this circuit is shown in the following Table 1 in which P0 through P3 correspond to respective byte positions stored in the register 62.

TABLE 1

| | recurrent data pattern | | | |
|---|---|---|---|---|
| | P0 | P1 | P2 | P3 |
| when the transfer receiving initiation address is 1 | A | A | A | A |
| when the transfer receiving initiation address is 2 | A | B | A | B |
| when the transfer receiving initiation address is 3 | A | A | B | C |
| when the transfer receiving initiation address is 4 | A | B | C | D |

Further, the arithmetic operation processing unit 32B is provided with a transfer receiving side (TRS) data writing control circuit 67 which produces a write signal MW that writes in the TRS data address of the memory device 31 the data sent from the TRS data register 63 through line 72. When supplied with the control signal S14 produced by the byte selection control circuit 61, the control circuit 67 sends out the aforementioned write signal MW and a control signal to the transfer initiation instruction unit 40 to cause the same to produce a transfer receiving address signal to write data in the TRS address register.

Figure 4:
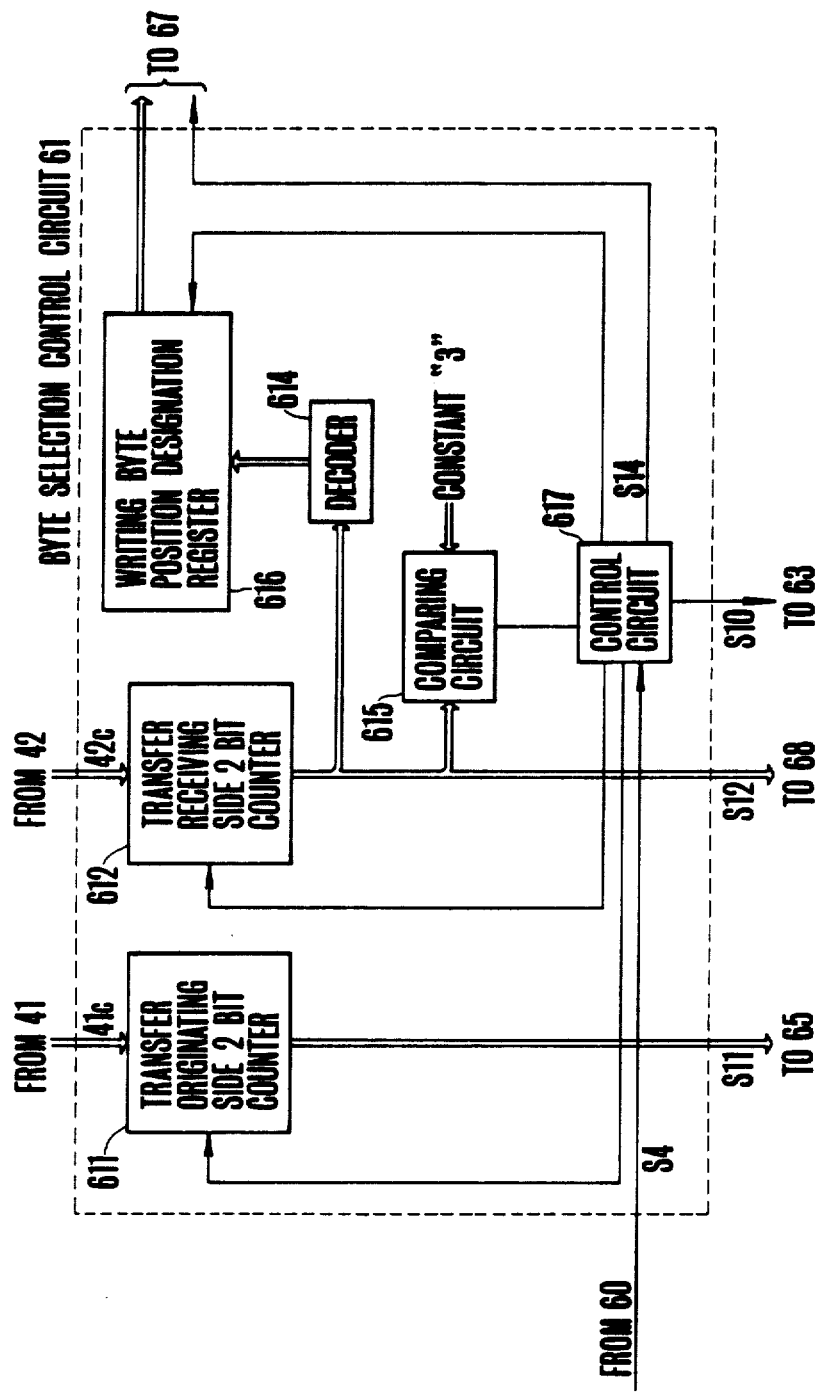
FIG. 4 is a block diagram showing one example of a byte selection control circuit shown in FIG. 3.

FIG. 4 shows one example of the byte selection control circuit 61 shown in FIG. 3 which comprises a transfer originating two bit counter 611 and a transfer receiving two bit counter 612. These counters 611 and 612 are connected to respectively receive the byte position as determined by the least significant two bits of the TOS and TRS address registers 41 and 42 for producing control signals S11 and S12 under the control of a control circuit 617 to be described hereinafter. The control signal S11 is sent to the byte selecting circuit 65 for selecting the byte data to be sent out from the TOS data register 62, and the control signal S12 sent to the byte selecting circuit 68 for the purpose of determining in what byte position of the TRS register 63 the data sent from the byte selecting circuit 65 should be stored, for effecting the duplicate processing. The control signal S12 produced by the counter 612 is also sent to a decoder 614, comparator circuit 615 and control circuit 617. This control signal S12 comprises four bits and is converted into a code "0, 1, 2, 3", and is sent to a write position designation register 616 which functions to store the output of the decoder 614 in accordance with a set signal sent with a timing for setting data in the TRS register 63. The output from this register 616 is sent to the TRS data writing control circuit 67 for forming a control signal applied to the transfer initiation instruction unit 40.

The comparator circuit 615 compares the output of the counter 612 with a constant "3" representing the last byte position "3" and when a coincidence is obtained, the comparator circuit 615 sends a coincidence output to the control circuit 617. When the control circuit 617 is supplied with the output of the comparator circuit 615 under the control of the control signal S4, it sends a control signal S14 to the TRS data writing control circuit 67 to cause it to produce a write signal MW. Furthermore, upon receival of the control signal S4, the control circuit 617 produces a control signal S10 and a set signal applied to register 616 at a predetermined timing.

Figure 5:
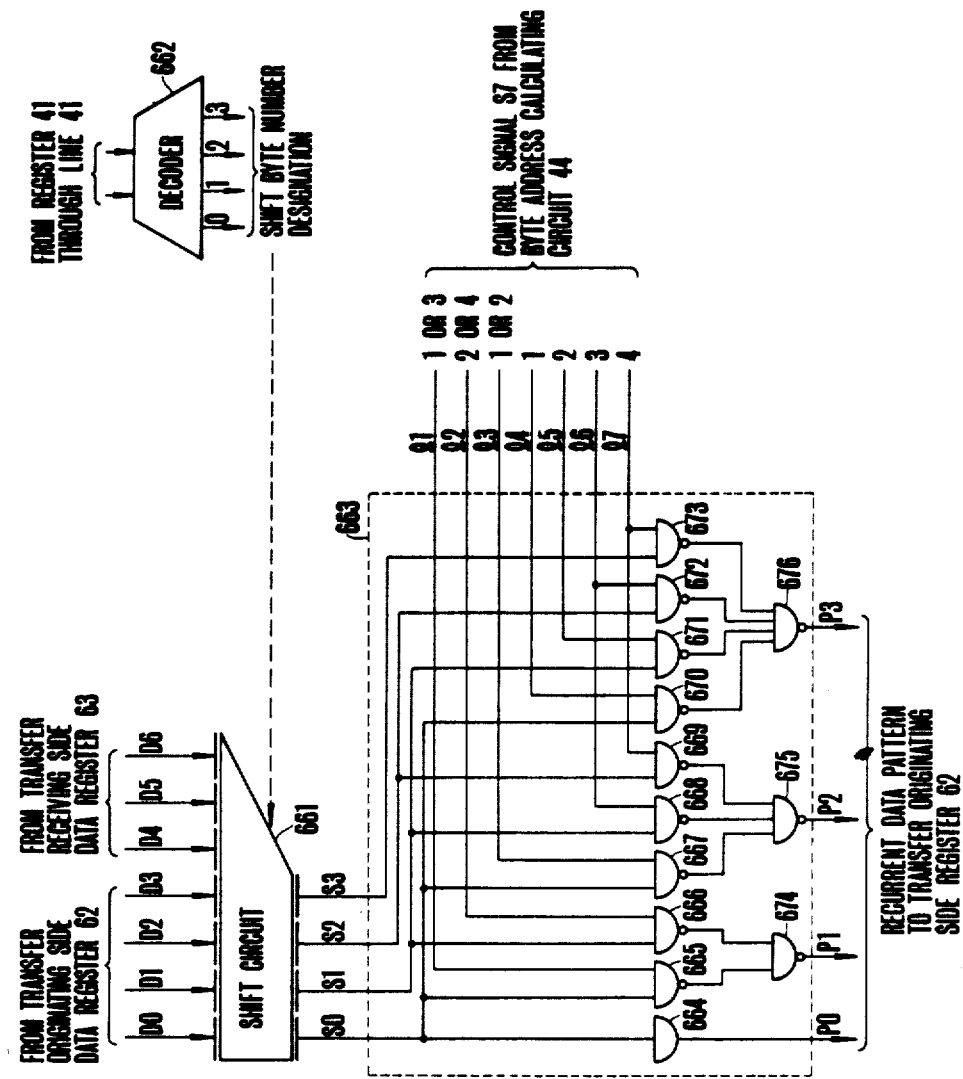
FIG. 5 is a connection diagram showing one example of a recurrent pattern forming circuit shown in FIG. 3.

FIG. 5 shows one example of the recurrent data pattern forming circuit 66 which comprises a shift circuit 661 connected to receive the outputs D0 through D6 of the TOS and TRS data registers 62 and 63, a decoder 662 connected to receive through a line 416 the least significant two bits of the TOS address register 41 for the purpose of designating the number of the shift bytes of the shift circuit 661 and a recurrent data pattern forming logic circuit 663 which forms recurrent data pattern outputs P0 through P3 in accordance with the outputs S0 through S3 of the shift circuit 661 and the control signal S7 from the byte address difference calculating circuit 44. Among the inputs of the shift circuit 661, the inputs D0 through D3 are connected to receive data which have been stored at the byte positions "0"–"3" of the TOS data register 62, whereas inputs D4 through D6 are connected to receive the data at byte positions "0", "1" and "2" respectively of the TRS data register 63. The relationship between the input to the shift circuit 661 and the output thereof is controlled by the output of the decoder 662 and the relationship between the inputs D0 through D6 corresponding to the number of the shift bytes designated by the output of the decoder 662 and the outputs S0 through S3 as shown in Table 2 below.

TABLE 2

| number of shift bytes designated | Shift circuit output | | | |
|---|---|---|---|---|
| | S0 | S1 | S2 | S3 |
| 0 | D0 | D1 | D2 | D3 |
| 1 | D1 | D2 | D3 | D4 |
| 2 | D2 | D3 | D4 | D5 |
| 3 | D3 | D4 | D5 | D6 |

For example, when the initiation byte address of the TOS address is "0" the inputs D0 through D3 are produced as the outputs S0 through S3 whereas when the initiation address is "1" inputs D1 through D4 would be produced as the outputs. Similarly, when the initiation address is "2" inputs D2 through D5 are produced as the outputs whereas when the initiation address is "3" inputs D3 through D6 are produced as outputs S0 through S3.

The logic circuit 663 comprises an AND gate circuit 664 and a NAND gate circuits 665 through 676, and executes logical operations as shown in Table 3 by combining the outputs S0 through S3 from the shift circuit 661 and a signal S7 supplied from the byte address calculating circuit 44 over control lines 11 through 17 thereby forming patterns P0 through P3.

TABLE 3

| byte address difference | recurrent data pattern | | | |
|---|---|---|---|---|
| | P0 | P1 | P2 | P3 |
| 1 | S0 | S0 | S0 | S0 |
| 2 | S0 | S1 | S0 | S1 |
| 3 | S0 | S0 | S1 | S2 |
| 4 | S0 | S1 | S2 | S3 |

For example, where the control signal S7 represents a byte address difference "1" an "1" signal would be produced on control lines 11, 13 and 14 respectively. Consequently, the outputs of the NAND gate circuits 665, 667 and 670 are inverted and the inputs of the NAND gate circuits 674, 675 and 676 are also inverted thus producing "S0" as the outputs P0 through P3 of these NAND gate circuits. Where the control signal S7 represents the byte address difference "2" an "1" signal would be applied to control lines 12, 13 and 15 respectively. As a consequence, the outputs of the NAND gate circuits 666, 667 and 671 are inverted and the inputs to the NAND gate circuits 674, 675 and 676 are also inverted so that signals S0, S1, S0 and S1 would be produced as the outputs of these NAND gate circuits. On the other hand, when the control signal S7 represents the byte address difference "3" an "1" signal is supplied to the control lines 11 and 16 with the result that the outputs of the NAND gate circuits 665, 668 and 672 are inverted and hence the inputs to the NAND gate circuits 674, 675 and 676 are also inverted so that signals S0, S0, S1 and S2 are produced as the recurrent data pattern outputs P0 through P3 of these NAND gate circuits. Where the control signal S7 represents the byte address difference "4", a "1" signal would be supplied to control lines 12 and 17 respectively. Consequently, the outputs of the NAND gate circuits 666, 669 and 673 are inverted and the inputs to the NAND gate circuits 674, 675 and 676 are also inverted with the result that signals "S0, S1, S2, S3" are produced as the recurrent data pattern output P0 through P3.

Consequently, when the data stored in the transfer originating side (TOS) data register 62 is, [A][B][C], the data stored in the transfer receiving side (TRS) data register 63 is [D][E][F][G] and when the data of the least significant two bits sent from the register 41 over line 416 represents shift byte number "1" the shift circuit 661 would produce [A][B][C][D] as its outputs S0 through S3. At this time, if the byte address difference between the transfer originating side and the transfer receiving side is "4" an "1" signal would be produced on control lines 12 and 17 as the control signal S7, with the result that [A][B][C][D] would be produced as the recurrent data pattern outputs P0 through P3.

With reference now to FIGS. 6A through 6E, one example of the data transfer flow between the memory device utilized in this embodiment will be described on the assumption that the difference between the TOS address and the TRS address is "4" and that the number of the transfer byte is "9".

Figure 6A:
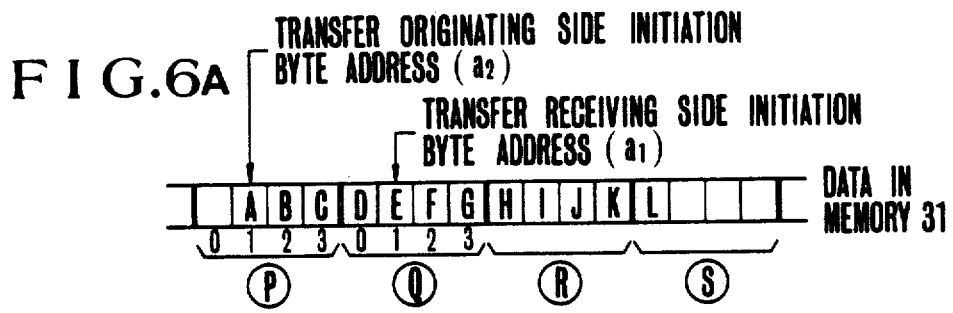
FIG. 6A through 6E are diagrams for explaining the data transfer operation of the apparatus shown in FIG. 3.

FIG. 6A shows a data arrangement in the memory device before transfer, that is the arrangement of the transfer originating side data. As will become apparent from the following description, 9 byte data A through I are transferred from an address $a_1$ to an address $a_2$ spaced therefrom by 4 bytes to be right. Dual lines between 4 bytes represent groups of bytes constituting sets, each being handled as one unit of the information, that is one word. Symbols Ⓟ — Ⓢ represent words.

In operation, when a transfer initiation instruction is generated, the transfer initiation instruction unit 40 is triggered to store address information regarding the addresses a₁ and a₂ in the TOS and TRS address registers 41 and 42 and their contents are applied to the memory device 31 via output lines 41a, 42a and a bus line. In this case, in the least significant two bits of respective registers are stored information representing the addresses a₁ and a₂ showing specific byte positions of respective words. At the same time, the transfer initiation instruction unit 40 sends a control signal S1 to the duplicate processing control circuit 59 to set the same in the duplicate processing waiting state at which time the instruction unit 40 sends a control signal S5 to a transfer originating side first word read control circuit 48 of the memory device 31 to cause it to produce a control signal MR1 to read out the first word Ⓟ including the transfer originating initiation byte address a₁ of the memory device.

The address information of the registers 41 and 42 are also sent to the byte address calculating circuit 44. In this case, as has been pointed out hereinabove, the transfer initiation byte address (a₁) on the transfer originating side and the transfer initiation bite address (a₂) on the transfer receiving side are displayed by 4 bytes and the transfer originating address is at a lower order byte than that of the transfer receiving address.

Consequently, the byte address difference calculating circuit 44 sends an output S6 requesting the initiation of the duplicate processing to the duplicate processing control circuit 59. When this circuit is supplied with signal S6 concurrently with a signal S1 from the transfer initiation instruction unit 40 it performs the duplicate processing operation of this invention. Further, the byte address difference calculating circuit 44 applies to a recurrent data pattern forming circuit 66 a control signal S7 consisting of a plurality of bits and representing that the difference in the byte addresses is 4 bytes. This processing operation will be discussed later.

At first, the duplicate processing control circuit 59 sends a control signal S2 to a transfer originating side second word data read out control circuit 60 of the memory device. In response to this control signal S2, the control circuit 60 sends a control signal S9 to a TOS data register 62 to set the same in a state capable of receiving the data from the memory device 31 thus storing the data of the first word Ⓟ the memory device 31 in register 62 via bus line 64.

The register 41 supplies the least significant 2 bit information of the TOS address register 41 (a byte position "1" signal representing the first address of the word P to the byte address comparing circuit 45, the byte selection control circuit 61 and to the recurrent data pattern forming circuit 66 through line 41c Similarly, the transfer receiving side address register 42 sends the least significant two bit information (a byte position signal "1" representing the first address of the word Ⓠ ) of the transfer receiving side address register 42 to the byte address comparing circuit 45 and the byte selection control circuit 61.

Since the TOS byte position is the first address of the word Ⓟ and the TRS byte position is also the first address of the word Ⓠ comparing circuit 45 will send the control signal S8 to the TOS data read out control circuit 60 of the memory device 31. When the TOS data read out control circuit 60 receives the control signal S8 from the address comparing circuit 45 concurrently with the control signal S2 from the control circuit 60, it produces a control signal MR2 that instructs read out of the memory device 31. At this time, the control circuit 61 applies a control signal S10 to register 63 thus changing it to a state capable of writing the data to the memory device 31. Consequently, the data of the second word Ⓠ from the memory device 31 are stored in the TRS data register 63 via line 64.

When the data is stored in the TOS and TRS data registers 62 and 63, the control circuit 60 applies a control signal S11 to the duplicate processing control circuit 59. This signal S11 represents that the data for executing the duplicate processing have been stored in the TOS and TRS data registers 62 and 63.

Figure 6B:
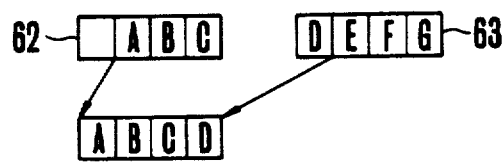

The recurrent data pattern forming circuit 66 initiates formation of the recurrent data pattern when the first and second words Ⓟ and Ⓠ been stored respectively in the TOS and TRS data registers 62 and 63. This operation has already been described in detail in connection with FIG. 5. Since the circuit 66 is supplied with the least significant two bit information sent from the transfer originating side address register 41, that is a signal representing that the number of the shift bytes to be designated is "1", and a control signal S7 sent from the byte address difference calculating circuit 44 and representing that the byte address difference is "4", the first to third byte addresses of the first word Ⓟ stored in the register 62 and the data of the 0th byte of second word Q are determined to be the recurrent data pattern. As a consequence, the data shown on the lower stage of FIG. 6B are stored in the register 62 via line 70. At this time, since the duplicate processing control circuit 59 is being supplied with the control signal S11a it sends a control signal S3 to register 62 to set it in a state capable of storing the output of the recurrent data pattern forming circuit 66 in the register 62.

Figure 6C:
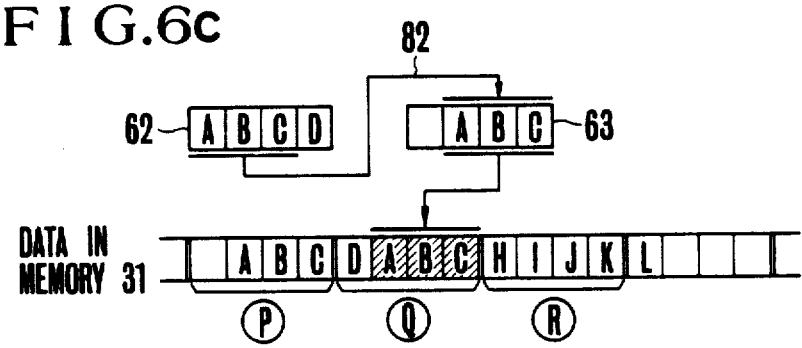
Figure 6D:
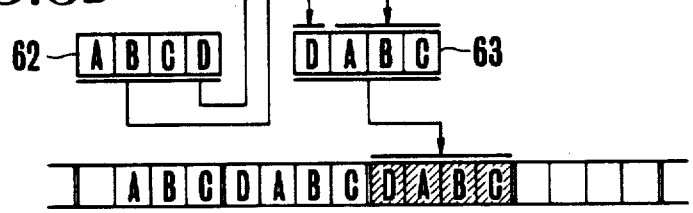

As above described, when the recurrent data pattern has been stored in the register 62, the duplicate processing control circuit 59 applies the control signal S4 to the byte selection control circuit 61 thereby executing a processing shown in FIG. 6C.

More particularly, at this time, in the TOS data register 62 are stored data utilizing "ABCD" shown in the lower stage in FIG. 6b as the recurrent data pattern. Under these conditions, the byte selection circuit 61 determines that the byte position to be selected is the "1" byte address based on the least significant two bit information sent from the TRS address register 42 over line 42c, thereby sending an output S12 that designates this address to the byte selection circuit 65. Consequently, the byte selection circuit 65 supplies data "A" of the designated "1" byte address of the register 62 to the byte selection circuit 68 via line 71. This byte selection circuit 68 is also supplied from the byte selection control circuit 61 a control signal S12 that selects the byte position "1" address, with the result that the data "A" of the byte position "1" of the register 62 would be transferred to and stored in the byte position "1" of the register 63. The timing of storing the data in this register 63 is controlled by a control signal S10 from the control circuit 61. When storing of the data in the register 63 has been completed, the byte selection circuit 61 produces a control signal which selects the next byte, that is the byte position "2" of the register 62. Concurrently therewith the byte selection circuit 61 supplies to the byte selection circuit 68 a control signal S12 that stores the next data at the byte position "2" of the register 63.

Consequently, the data 'B' which has been stored in the byte position "2" of the register 62 would be stored in the byte position "2" of the register 63 through the circuit 65, the line 71 and the line 68. In the same manner, data "C" which has been stored at the byte position "3" of the register 62 is stored at the byte position "3" of the register 63 in accordance with the control signals S11 and S12 sent from the control circuit 61.

The transfer operation described above is shown by an arrow 82 depicted between registers 62 and 63 shown in FIG. 6C.

Upon completion of the above described operation, the byte selection control circuit 61 confirms that the data have been transferred to the "3" byte position in register 63, i.e. to the last byte of the Ⓠ sends a control signal S14 to the TRS data writing control circuit 67 of the memory device 31 for writing therein the content of the register 63, thereby causing the control circuit 67 to produce a write request signal MW. At this time, a transfer receiving address to be transferred from the TRS address register 42 is sent to the memory device 31 through line 42a. Consequently, data "ABC" sent from the register 63 are stored in byte positions "1"–"3" of word Ⓠ in the memory device 31 as shown in the lower stage of FIG. 6C.

Upon completion of the writing operation into the memory device 31 as above described, the storing operation of the recurring pattern into word Ⓡ commenced. Thus, the byte selection control circuit 61 sends to the byte selection circuit 65 a control signal S11 that selects the third byte position "3" of the register 62 that has not been selected by the transfer operation shown in FIG. 6C, and a byte selection circuit 68 is supplied from the byte selection control circuit 61 with a control signal S12 for storing the next data at the byte position "D" of the register 63. Under these conditions, the date "D" at the byte position "3" of the register 62 is stored in the byte position "0" of the register 63 through circuit 65, line 71 and circuit 68.

At this time, the byte selection control circuit 61 sequentially sends to the byte selection circuit 65 control signal S11 which selects byte positions "0", "1" and "2" of the register 62 and at the same time the circuit 61 sends to the byte selection circuit 68 a control signal S12 that stores the data sent to the byte positions "1", "2" and "3" of the register 63. Consequently, in the same manner as above described, the data "A", "B" and "C" in the byte positions "0", "1" and "2" of the register 62 are sequentially stored in the byte positions "1", "2" and "3" of the register 63.

When the data of the word Ⓡ been completely stored in the register 63, the byte selection control circuit 61 would send a control signal S14 to the transfer receiving side data writing control circuit 67 of the memory device 31 for causing the same to produce the write signal MW thereby writing the data "DABC" stored in the register 63 into an address of the memory device into which the word Ⓠ is to be written.

Figure 6E:
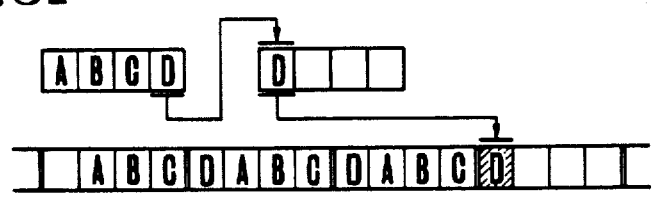

When the above described writing operation is completed the byte selection control circuit 61 resumes the transfer operation of the next word Ⓡ as shown in FIG. 6e, and the data "D" which has been stored in the byte position "3" of the register 62 is stored in the byte position "0" of the register 63 thereby writing the data in register 63 into the memory device 31. The control of respective transfer steps is the same as that described above.

Figure 7:
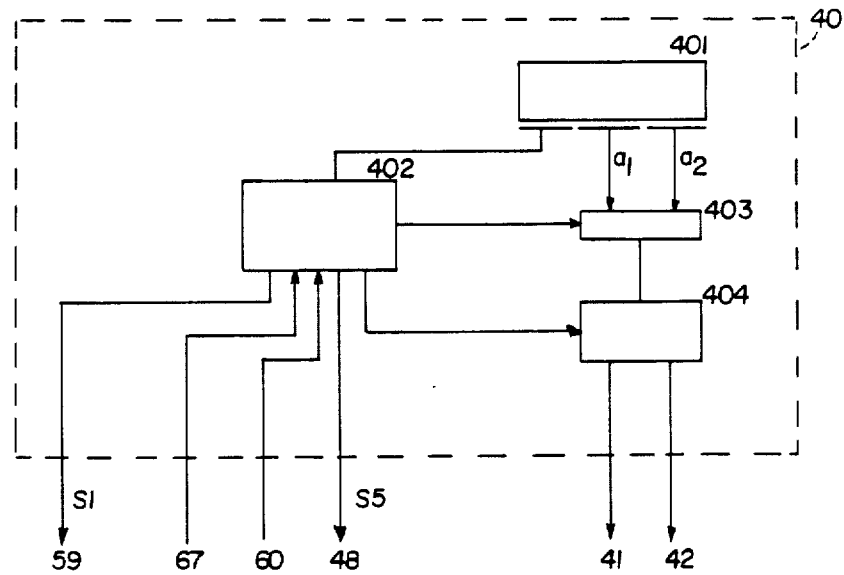
FIG. 7 is a diagram showing one example of a transfer initiation instruction unit.

FIG. 7 shows one example of transfer initiation instruction unit 40. When a transfer instruction is set in instruction register 401, instruction sequential control circuit 402 is actuated. Then the transfer receiving side address disignator a1 and the transfer originating side address designator a2 are sequentially selected by selector 403, and a transfer receiving side address and a transfer originating side address are produced by adder circuit 404 and sent to the transfer receiving side address register 42 and the transfer originating side address register 41. Simultaneously, since is is a transfer instruction, a control signal S1 is transmitted to notify the duplicate processing control circuit 59. Further, a transfer originating side first word read out control signal S5 is transmitted to the transfer originating side first word read out control circuit 48.

When a tranfer originating side second word read out is signaled by the transfer originating side data read out control circuit 60, designator a2 is selected by the selector 403 and a transfer originating side second word address is produced to be sent to the transfer originating side address register 41.

Further, when a write to transfer receiving side is signaled by the transfer originating side data writing control circuit 67, designator a1 is selected by the selector 403, and a transfer receiving side writing address is produced by the adder circuit 404 to be sent to the transfer receiving side address register 42.

Figure 8:
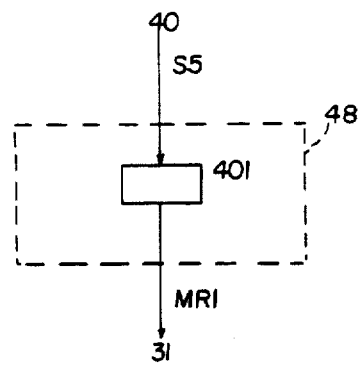
FIG. 8 is a diagram showing one example of a transfer originating side read out control circuit.

FIG. 8 shows one example of a transfer originating side read out control circuit 48. When a transfer instruction initiation control signal S5 is received from the transfer initiation instruction unit 40, demand register 401 for reading out from the memory the first word of the transfer originating side data is set to signal memory 31, by a control signal MR1, to read out of the transfer originating side first word.

Figure 9:
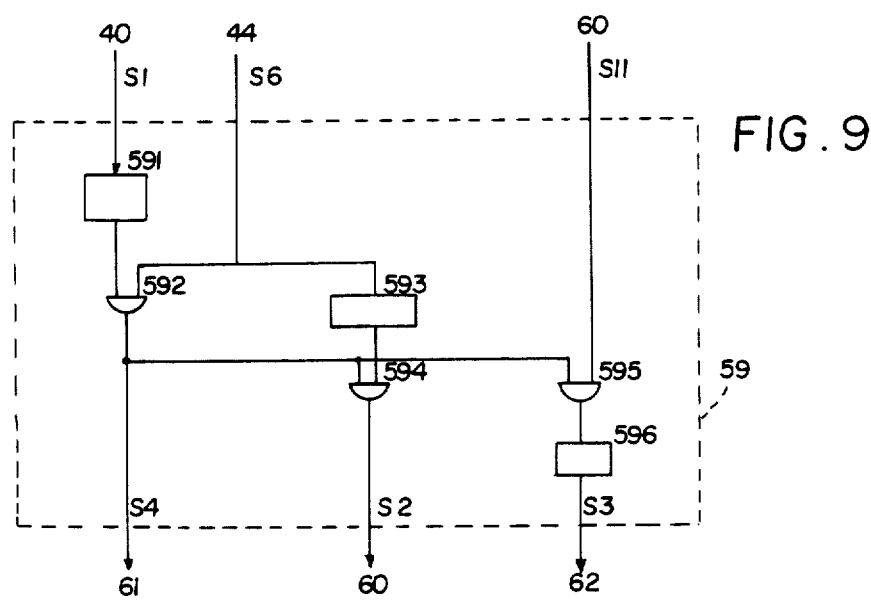
FIG. 9 is a diagram showing one example of a duplicate processing control circuit.

FIG. 9 shows one example of a duplicate processing control circuit 59. When a duplicate processing control signals S1 is transmitted from the transfer initiation instruction unit 40, a control output S6 from the byte address difference calculating circuit 44 is used to signal the duplicate processing control stand-by status register 591. When said control output S6 signal is generated, the address differential (between the transfer originating side address and the transfer receiving side address) is within byte address difference calculating circuit 44, the gate 592 is opened and a byte selection actuation signal S4 from duplicate processing control circuit 59 is transmitted to the byte selection control circuit 61. At the same time, the byte address difference reported through the control output S6 and also the transfer originating side address lower bits are decoded by the decoder 593. When it is necessary, as a result, to read out two words of the transfer originating side data, gate 594 is opened to transmit a control signal S2 to the transfer originating side data read out control circuit 60. Also, when it is reported by a control signal S11 that transfer originating side data are sent to the registers 62 and 63 from the transfer originating side read out control circuit 60, the gate 595 is opened and the recurrent data pattern set instructing flip flop 596 is set to transmit to the transfer originating side data register 62 a recurrent data pattern set control signal S3.

Figure 10:
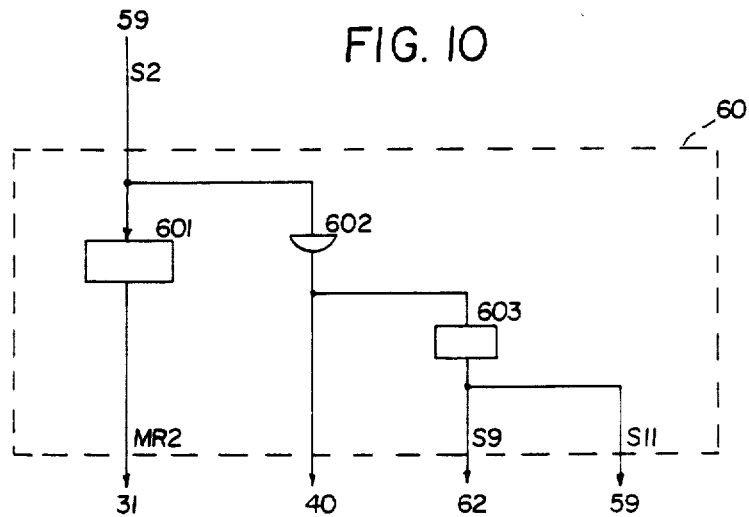
FIG. 10 is a diagram showing one example of a transfer originating side data read out control circuit.

FIG. 10 shows one example of a transfer originating side data read out control circuit 60. When it is reported from the duplicate processing control circuit 59 by control signal S2 that a transfer originating side second word data read out is necessary, the memory read out demand register 601 is set to transmit a data read out demand signal MR2 to the memory 31.

Also, by the S2 signal the gate is opened and it is relayed to the transfer initiation instruction unit 40 that the transfer originating side second word address is set in the transfer originating side address register 41. Simultaneously, the flip flop 603 is set for instructing the transfer originating side data register 62 to set the read out data from the memory, and by a control signal S9, it is instructed that the transfer originating side data register 62 be set. At the same time, by a control signal S11, it is reported to the duplicate processing control circuit 59 that the data from the recurrent data pattern forming circuit 66 be set in the transfer originating side data register 62.

Figure 11:
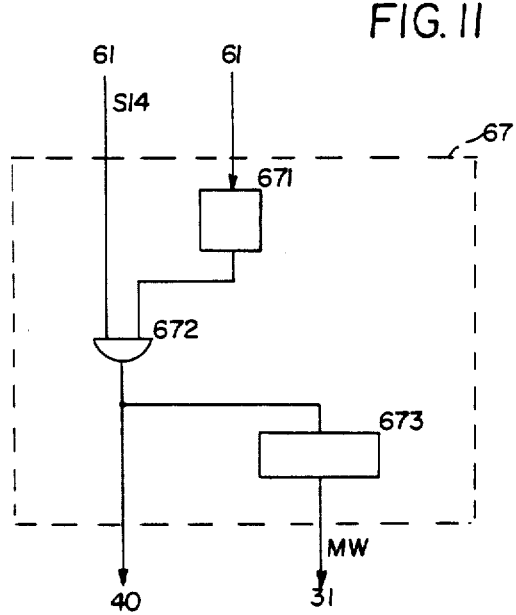
FIG. 11 is a diagram showing one example of a transfer receiving side data writing control circuit.

FIG. 11 shows one example of a transfer receiving side data writing control circuit 67. When a control signal S14 is received from the byte selection control circuit 61, it is detected by the decoder 671 that the position of the writing byte from the byte selection control circuit 61 is at the end of the word. At such time, gate 672 is opened and it is reported to the transfer initiation instruction unit 40 that a transfer receiving side writing address is set in the transfer receiving side address register 42. At the same time, the memory writing demand register 673 is set and a data writing demand signal MW is transmitted to the memory 31.

Figure 12:
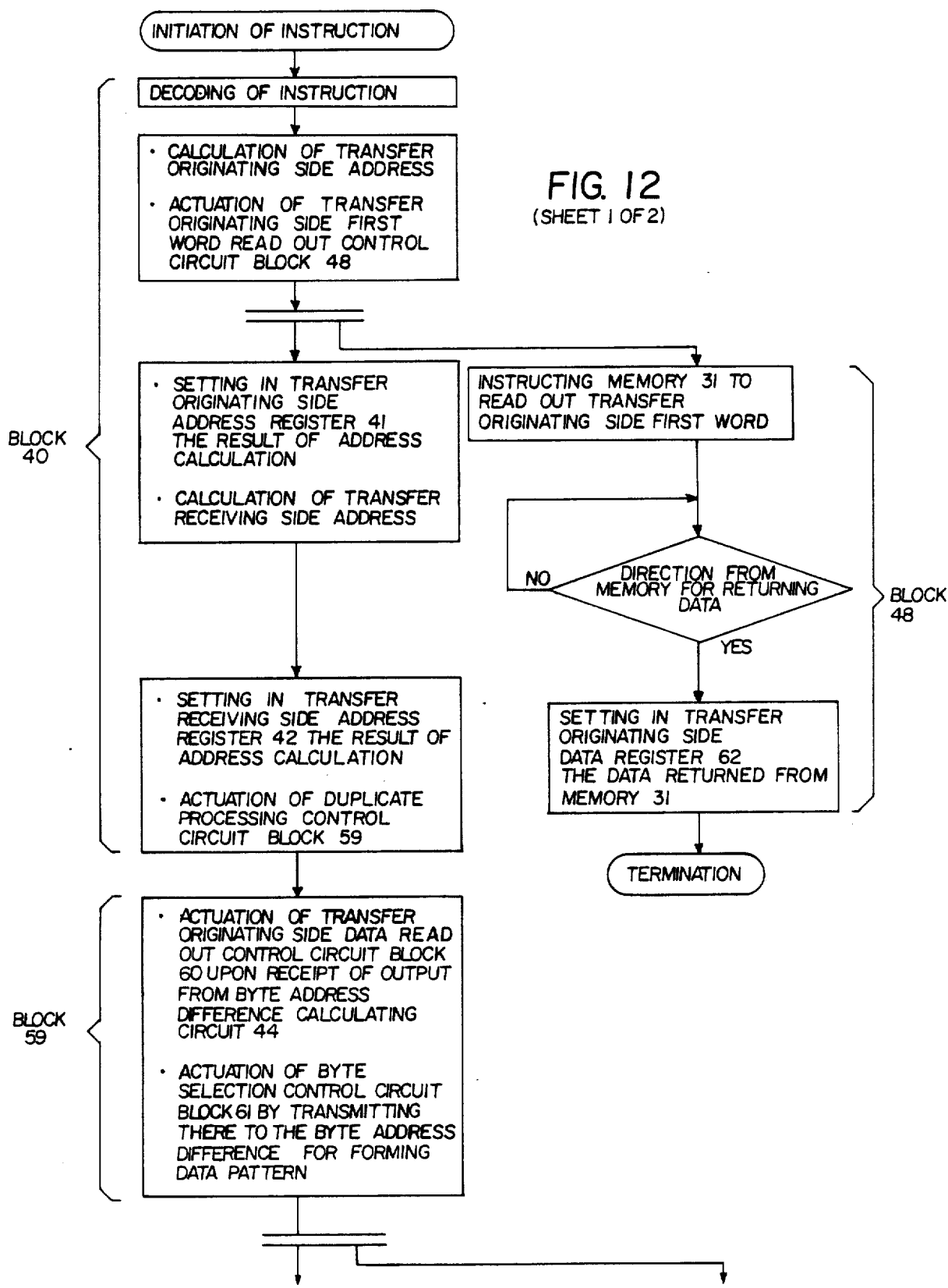
FIG. 12 is a flow chart showing the flow of processing of an instruction setting forth the timings of operations of blocks 40, 48, 59, 60, 61 and 67.
Figure 12:
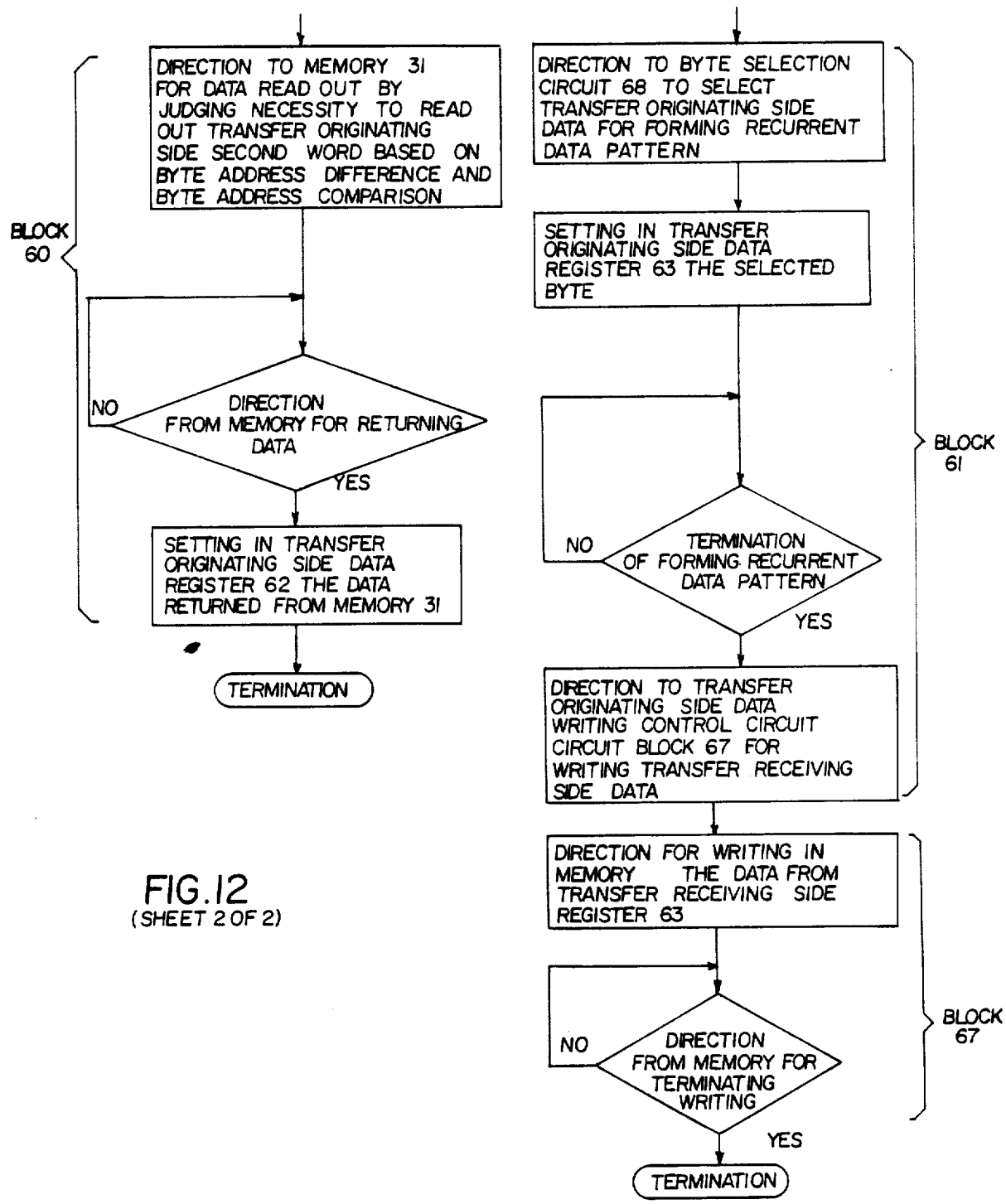

FIG. 12 is a flow chart showing the flow of processing of an instruction setting forth the timings of operations of blocks 40, 48, 59, 60, 61 and 67. Persons skilled in the art can utilize such flow chart in combination with the foregoing description to build the necessary circuitry for implementing the functions by said blocks 40, 48, 59, 60, 61 and 67.

As can be understood from the foregoing description, according to this invention, where the addresses are duplicated, and once the data to be transferred are read out from a memory device, a recurrent pattern formed by a recurrent pattern forming circuit is stored in a register and the stored pattern is repeatedly used in the subsequent transfer operations. For this reason, according to this invention, it is possible to decrease the number of read accesses to the memory device for obtaining the data to be transferred than the prior art apparatus shown in FIGS. 1 and 2 at least by several times. Thus, rewriting and read out of the data to be transferred become unnecessary thus greatly improving the data transfer capabilities between memory devices.

It should be understood that the invention is not limited to the specific embodiment described above and that various applications and modifications would be obvious to be skilled in the art. Thus, for example, although in FIG. 3, byte selection circuits 65 and 68 were provided independently of registers 62 and 63, the registers 62 and 63 may be constructed such that they can provide such logical selection operations.

What is claimed is:

1. A data transfer apparatus having a memory device, which memory device has a first memory region for storing a plurality of bytes of data to be transferred to a second memory region, which second memory region overlaps a portion of said first memory region, said data transfer apparatus comprising:

(a) a transfer originating side address storing means which addresses said memory device for storing the address of one of said plurality of bytes of data stored in said first memory region;

(b) a transfer receiving side address storing means which addresses said memory device for storing the address of one of a plurality of bytes located in said second memory region;

(c) address difference calculating means for calculating the differences between addresses stored in said transfer originating side address storing means and said transfer receiving side address storing means;

(d) comparing means for comparing addresses stored in said transfer originating side address storing means and said transfer receiving side address storing means and generating a control signal when the transfer originating side address storing means and the transfer receiving side address storing means address the same relative byte position within respective data words stored in said memory device;

(e) read out means coupled to said comparing means for reading said plurality of bytes stored in said first memory region;

(f) transfer originating side data storing means coupled to said memory device for storing said plurality of bytes of data read by said read out means;

(g) transfer receiving side data storing means coupled to said memory device for storing data at said address located in said second memory region;

(h) recurrent data pattern forming means coupled to said transfer receiving side data storing means and said transfer originating side data storing means for forming a recurrent data pattern of the data stored in said transfer originating side data storing means and said transfer receiving side data storing means and storing said recurrent data pattern in said transfer originating side data storing means;

(i) byte selection means for receiving the address of a byte stored in said transfer originating side address storing means and for receiving the address of a byte stored in said transfer receiving side address storing means, which addresses are determined by the least significant two bits of said transfer originating side addreass storing means and said transfer receiving side address storing means respectively, and which addresses are used to respectively select a byte position in the transfer originating side data storing means and a byte position in the transfer receiving side data storing means, said selected byte positions for storing data from said transfer originating side data storing means to said transfer receiving side data storing means;

(j) repeat means coupled to said address difference calculating means, said read out means, said byte designation means, and said transfer originating side data storing means for repeating the operations performed by said byte selection means, said transfer originating side data storing means, and said readout means a number of times equal to the address difference calculated by said address difference calculating means; and (k) transfer means for transferring the data formed by said recurrent data pattern forming means to said second memory region.

* * * * *

UNITED STATES PATENT AND TRADEMARK OFFICE
CERTIFICATE OF CORRECTION

PATENT NO. : 4,652,991

DATED : March 24, 1987

INVENTOR(S) : Kozo Yamano

It is certified that error appears in the above-identified patent and that said Letters Patent is hereby corrected as shown below:

Column 1, line 44, "processig" should read -- processing --.
Column 9, line 54, "P" should read --  --.

Signed and Sealed this

Second Day of August, 1988

Attest:

DONALD J. QUIGG

*Attesting Officer*  *Commissioner of Patents and Trademarks*